(12) United States Patent
Cooper

(10) Patent No.: US 8,444,911 B2
(45) Date of Patent: May 21, 2013

(54) SHAFT AND POST TENSIONING DEVICE

(76) Inventor: Paul V. Cooper, Chesterland, OH (US)

( * ) Notice: Subject to any disclaimer, the term of this patent is extended or adjusted under 35 U.S.C. 154(b) by 66 days.

(21) Appl. No.: 12/853,268

(22) Filed: Aug. 9, 2010

(65) Prior Publication Data

US 2011/0133051 A1    Jun. 9, 2011

Related U.S. Application Data

(60) Provisional application No. 61/232,390, filed on Aug. 7, 2009.

(51) Int. Cl.
*F04D 7/06* (2006.01)

(52) U.S. Cl.
USPC ........................ 266/235; 415/216.1

(58) Field of Classification Search
USPC ........................ 266/235; 415/216.1
See application file for complete search history.

(56) References Cited

U.S. PATENT DOCUMENTS

| 35,604 A | 6/1862 | Guild |
|---|---|---|
| 116,797 A | 7/1871 | Barnhart |
| 209,219 A | 10/1878 | Bookwalter |
| 251,104 A | 12/1881 | Finch |
| 364,804 A | 6/1887 | Cole |
| 390,319 A | 10/1888 | Thomson |
| 495,760 A | 4/1893 | Seitz |
| 506,572 A | 10/1893 | Wagener |
| 585,188 A | 6/1897 | Davis |
| 757,932 A | 4/1904 | Jones |
| 882,477 A | 3/1908 | Neumann |
| 882,478 A | 3/1908 | Neumann |
| 890,319 A | 6/1908 | Wells |
| 898,499 A | 9/1908 | O'Donnell |
| 909,774 A | 1/1909 | Flora |
| 919,194 A | 4/1909 | Livingston |
| 1,037,659 A | 9/1912 | Rembert |
| 1,100,475 A | 6/1914 | Franckaerts |
| 1,185,314 A | 5/1916 | Hedgcock |
| 1,196,758 A | 9/1916 | Blair |
| 1,331,997 A | 2/1920 | Neal |
| 1,377,101 A | 5/1921 | Sparling |
| 1,380,798 A | 6/1921 | Hansen et al. |
| 1,439,365 A | 12/1922 | Hazell |
| 1,454,967 A | 5/1923 | Gill |

(Continued)

FOREIGN PATENT DOCUMENTS

| CA | 683469 | 3/1964 |
|---|---|---|
| CA | 2115929 | 8/1992 |

(Continued)

OTHER PUBLICATIONS

USPTO; Office Action dated Nov. 28, 2011 in U.S. Appl. No. 12/120,190.

(Continued)

*Primary Examiner* — Scott Kastler
(74) *Attorney, Agent, or Firm* — Snell & Wilmer LLP

(57) ABSTRACT

A system for applying tension to a component for use in molten metal processing. Preferably, the component includes an outer core and at least one tension rod positioned partially within the outer core. The component is preferably elongated, such as a support post or an impeller shaft. The tension rod applies compression to the outer cover, which makes the outer cover more resistant to breakage if it strikes, or is stricken by, an object.

20 Claims, 7 Drawing Sheets

U.S. PATENT DOCUMENTS

| | | |
|---|---|---|
| 1,470,607 A | 10/1923 | Hazell |
| 1,513,875 A | 11/1924 | Wilke |
| 1,518,501 A | 12/1924 | Gill |
| 1,522,765 A | 1/1925 | Wilke |
| 1,526,851 A | 2/1925 | Hall |
| 1,669,668 A | 5/1928 | Marshall |
| 1,673,594 A | 6/1928 | Schmidt |
| 1,697,202 A | 1/1929 | Nagle |
| 1,717,969 A | 6/1929 | Goodner |
| 1,718,396 A | 6/1929 | Wheeler |
| 1,896,201 A | 2/1933 | Sterner-Rainer |
| 1,988,875 A | 1/1935 | Saborio |
| 2,013,455 A | 9/1935 | Baxter |
| 2,038,221 A | 4/1936 | Kagi |
| 2,090,162 A | 8/1937 | Tighe |
| 2,091,677 A | 8/1937 | Fredericks |
| 2,138,814 A | 12/1938 | Bressler |
| 2,173,377 A | 9/1939 | Schultz, Jr. et al. |
| 2,264,740 A | 12/1941 | Brown |
| 2,280,979 A | 4/1942 | Rocke |
| 2,290,961 A | 7/1942 | Heuer |
| 2,300,688 A | 11/1942 | Nagle |
| 2,304,849 A | 12/1942 | Ruthman |
| 2,368,962 A | 2/1945 | Blom |
| 2,383,424 A | 8/1945 | Stepanoff |
| 2,423,655 A | 7/1947 | Mars et al. |
| 2,488,447 A | 11/1949 | Tangen et al. |
| 2,493,467 A | 1/1950 | Sunnen |
| 2,515,097 A | 7/1950 | Schryber |
| 2,515,478 A | 7/1950 | Tooley et al. |
| 2,528,208 A | 10/1950 | Bonsack et al. |
| 2,528,210 A | 10/1950 | Stewart |
| 2,543,633 A | 2/1951 | Lamphere |
| 2,566,892 A | 9/1951 | Jacobs |
| 2,625,720 A | 1/1953 | Ross |
| 2,626,086 A | 1/1953 | Forrest |
| 2,676,279 A | 4/1954 | Wilson |
| 2,677,609 A | 5/1954 | Moore et al. |
| 2,698,583 A | 1/1955 | House et al. |
| 2,714,354 A | 8/1955 | Farrand |
| 2,762,095 A | 9/1956 | Pemetzrieder |
| 2,768,587 A | 10/1956 | Corneil |
| 2,775,348 A | 12/1956 | Williams |
| 2,779,574 A | 1/1957 | Schneider |
| 2,787,873 A | 4/1957 | Hadley |
| 2,808,782 A | 10/1957 | Thompson et al. |
| 2,809,107 A | 10/1957 | Russell |
| 2,821,472 A | 1/1958 | Peterson et al. |
| 2,824,520 A | 2/1958 | Bartels |
| 2,832,292 A | 4/1958 | Edwards |
| 2,853,019 A | 9/1958 | Thorton |
| 2,865,618 A | 12/1958 | Abell |
| 2,901,677 A | 8/1959 | Chessman et al. |
| 2,906,632 A | 9/1959 | Nickerson |
| 2,918,876 A | 12/1959 | Howe |
| 2,948,524 A | 8/1960 | Sweeney et al. |
| 2,958,293 A | 11/1960 | Pray, Jr. |
| 2,978,885 A | 4/1961 | Davison |
| 2,984,524 A | 5/1961 | Franzen |
| 2,987,885 A | 6/1961 | Hodge |
| 3,010,402 A | 11/1961 | King |
| 3,015,190 A | 1/1962 | Arbeit |
| 3,039,864 A | 6/1962 | Hess |
| 3,044,408 A | 7/1962 | Mellott |
| 3,048,384 A | 8/1962 | Sweeney et al. |
| 3,070,393 A | 12/1962 | Silverberg et al. |
| 3,092,030 A | 6/1963 | Wunder |
| 3,099,870 A | 8/1963 | Seeler |
| 3,130,678 A | 4/1964 | Chenault |
| 3,130,679 A | 4/1964 | Sence |
| 3,171,357 A | 3/1965 | Egger |
| 3,203,182 A | 8/1965 | Pohl |
| 3,227,547 A | 1/1966 | Szekely |
| 3,244,109 A | 4/1966 | Barske |
| 3,251,676 A | 5/1966 | Johnson |
| 3,255,702 A | 6/1966 | Gehrm |
| 3,258,283 A | 6/1966 | Winberg et al. |
| 3,272,619 A | 9/1966 | Sweeney et al. |
| 3,289,473 A | 12/1966 | Louda |
| 3,289,743 A | 12/1966 | Louda |
| 3,291,473 A | 12/1966 | Sweeney et al. |
| 3,374,943 A | 3/1968 | Cervenka |
| 3,400,923 A | 9/1968 | Howie et al. |
| 3,417,929 A | 12/1968 | Secrest et al. |
| 3,432,336 A | 3/1969 | Langrod |
| 3,459,133 A | 8/1969 | Scheffler |
| 3,459,346 A | 8/1969 | Tinnes |
| 3,477,383 A | 11/1969 | Rawson et al. |
| 3,487,805 A | 1/1970 | Satterthwaite |
| 3,512,762 A | 5/1970 | Umbricht |
| 3,512,788 A | 5/1970 | Kilbane |
| 3,561,885 A | 2/1971 | Lake |
| 3,575,525 A | 4/1971 | Fox et al. |
| 3,618,917 A | 11/1971 | Fredrikson |
| 3,620,716 A | 11/1971 | Hess |
| 3,650,730 A | 3/1972 | Derham et al. |
| 3,689,048 A | 9/1972 | Foulard et al. |
| 3,715,112 A | 2/1973 | Carbonnel |
| 3,732,032 A | 5/1973 | Daneel |
| 3,737,304 A | 6/1973 | Blayden |
| 3,737,305 A | 6/1973 | Blayden et al. |
| 3,743,263 A | 7/1973 | Szekely |
| 3,743,500 A | 7/1973 | Foulard et al. |
| 3,753,690 A | 8/1973 | Emley et al. |
| 3,759,628 A | 9/1973 | Kempf |
| 3,759,635 A | 9/1973 | Carter et al. |
| 3,767,382 A | 10/1973 | Bruno et al. |
| 3,776,660 A | 12/1973 | Anderson et al. |
| 3,785,632 A | 1/1974 | Kraemer et al. |
| 3,787,143 A | 1/1974 | Carbonnel et al. |
| 3,799,522 A | 3/1974 | Brant et al. |
| 3,799,523 A | 3/1974 | Seki |
| 3,807,708 A | 4/1974 | Jones |
| 3,814,400 A | 6/1974 | Seki |
| 3,824,028 A | 7/1974 | Zenkner et al. |
| 3,824,042 A | 7/1974 | Barnes et al. |
| 3,836,280 A | 9/1974 | Koch |
| 3,839,019 A | 10/1974 | Bruno et al. |
| 3,844,972 A | 10/1974 | Tully, Jr. et al. |
| 3,871,872 A | 3/1975 | Downing et al. |
| 3,873,073 A | 3/1975 | Baum et al. |
| 3,873,305 A | 3/1975 | Claxton et al. |
| 3,881,039 A | 4/1975 | Baldieri et al. |
| 3,886,992 A | 6/1975 | Maas et al. |
| 3,915,594 A | 10/1975 | Nesseth |
| 3,915,694 A | 10/1975 | Ando |
| 3,941,588 A | 3/1976 | Dremann |
| 3,941,589 A | 3/1976 | Norman et al. |
| 3,954,134 A | 5/1976 | Maas et al. |
| 3,958,979 A | 5/1976 | Valdo |
| 3,958,981 A | 5/1976 | Forberg et al. |
| 3,961,778 A | 6/1976 | Carbonnel et al. |
| 3,966,456 A | 6/1976 | Ellenbaum et al. |
| 3,972,709 A | 8/1976 | Chin et al. |
| 3,976,286 A | 8/1976 | Thompson et al. |
| 3,984,234 A | 10/1976 | Claxton et al. |
| 3,985,000 A | 10/1976 | Hartz |
| 3,997,336 A | 12/1976 | van Linden et al. |
| 4,003,560 A | 1/1977 | Carbonnel |
| 4,008,884 A | 2/1977 | Fitzpatrick et al. |
| 4,018,598 A | 4/1977 | Markus |
| 4,052,199 A | 10/1977 | Mangalick |
| 4,055,390 A | 10/1977 | Young |
| 4,063,849 A | 12/1977 | Modianos |
| 4,068,965 A | 1/1978 | Lichti |
| 4,091,970 A | 5/1978 | Kimiyama et al. |
| 4,119,141 A | 10/1978 | Thut et al. |
| 4,126,360 A | 11/1978 | Miller et al. |
| 4,128,415 A | 12/1978 | van Linden et al. |
| 4,169,584 A | 10/1979 | Mangalick |
| 4,191,486 A | 3/1980 | Pelton |
| 4,213,742 A | 7/1980 | Henshaw |
| 4,242,039 A | 12/1980 | Villard et al. |
| 4,244,423 A | 1/1981 | Thut et al. |
| 4,286,985 A | 9/1981 | van Linden et al. |
| 4,305,214 A | 12/1981 | Hurst |
| 4,322,245 A | 3/1982 | Claxton |

| Patent No. | Date | Inventor |
|---|---|---|
| 4,338,062 A | 7/1982 | Neal |
| 4,347,041 A | 8/1982 | Cooper |
| 4,351,514 A | 9/1982 | Koch |
| 4,355,789 A | 10/1982 | Dolzhenkov et al. |
| 4,360,314 A | 11/1982 | Pennell |
| 4,370,096 A | 1/1983 | Church |
| 4,372,541 A | 2/1983 | Bocourt et al. |
| 4,375,937 A | 3/1983 | Cooper |
| 4,389,159 A | 6/1983 | Sarvanne |
| 4,392,888 A | 7/1983 | Eckert et al. |
| 4,410,299 A | 10/1983 | Shimoyama |
| 4,419,049 A | 12/1983 | Gerboth et al. |
| 4,456,424 A | 6/1984 | Araoka |
| 4,470,846 A | 9/1984 | Dube |
| 4,474,315 A | 10/1984 | Gilbert et al. |
| 4,496,393 A | 1/1985 | Lustenberger |
| 4,504,392 A | 3/1985 | Groteke |
| 4,537,624 A | 8/1985 | Tenhover et al. |
| 4,537,625 A | 8/1985 | Tenhover et al. |
| 4,556,419 A | 12/1985 | Otsuka et al. |
| 4,557,766 A | 12/1985 | Tenhover et al. |
| 4,586,845 A | 5/1986 | Morris |
| 4,592,700 A | 6/1986 | Toguchi et al. |
| 4,594,052 A | 6/1986 | Niskanen |
| 4,598,899 A | 7/1986 | Cooper |
| 4,600,222 A | 7/1986 | Appling |
| 4,607,825 A | 8/1986 | Briolle et al. |
| 4,609,442 A | 9/1986 | Tenhover et al. |
| 4,611,790 A | 9/1986 | Otsuka et al. |
| 4,617,232 A | 10/1986 | Chandler et al. |
| 4,634,105 A | 1/1987 | Withers et al. |
| 4,640,666 A | 2/1987 | Sodergard |
| 4,655,610 A | 4/1987 | Al-Jaroudi |
| 4,684,281 A | 8/1987 | Patterson |
| 4,685,822 A | 8/1987 | Pelton |
| 4,696,703 A | 9/1987 | Henderson et al. |
| 4,701,226 A | 10/1987 | Henderson et al. |
| 4,702,768 A | 10/1987 | Areauz et al. |
| 4,714,371 A | 12/1987 | Cuse |
| 4,717,540 A | 1/1988 | McRae et al. |
| 4,739,974 A | 4/1988 | Mordue |
| 4,743,428 A | 5/1988 | McRae et al. |
| 4,747,583 A | 5/1988 | Gordon et al. |
| 4,767,230 A | 8/1988 | Leas, Jr. |
| 4,770,701 A | 9/1988 | Henderson et al. |
| 4,786,230 A | 11/1988 | Thut |
| 4,802,656 A | 2/1989 | Hudault et al. |
| 4,804,168 A | 2/1989 | Otsuka et al. |
| 4,810,314 A | 3/1989 | Henderson et al. |
| 4,834,573 A | 5/1989 | Asano et al. |
| 4,842,227 A | 6/1989 | Harrington et al. |
| 4,844,425 A | 7/1989 | Piras et al. |
| 4,851,296 A | 7/1989 | Tenhover et al. |
| 4,859,413 A | 8/1989 | Harris et al. |
| 4,867,638 A | 9/1989 | Handtmann et al. |
| 4,884,786 A | 12/1989 | Gillespie |
| 4,898,367 A | 2/1990 | Cooper |
| 4,908,060 A | 3/1990 | Duenkelmann |
| 4,923,770 A | 5/1990 | Grasselli et al. |
| 4,930,986 A | 6/1990 | Cooper |
| 4,931,091 A | 6/1990 | Waite et al. |
| 4,940,214 A | 7/1990 | Gillespie |
| 4,940,384 A | 7/1990 | Amra et al. |
| 4,954,167 A | 9/1990 | Cooper |
| 4,973,433 A | 11/1990 | Gilbert et al. |
| 4,986,736 A | 1/1991 | Kajiwara |
| 4,989,736 A | 2/1991 | Andersson et al. |
| 5,015,518 A | 5/1991 | Sasaki et al. |
| 5,025,198 A | 6/1991 | Mordue et al. |
| 5,028,211 A | 7/1991 | Mordue et al. |
| 5,029,821 A | 7/1991 | Bar-on et al. |
| 5,078,572 A | 1/1992 | Amra et al. |
| 5,080,715 A | 1/1992 | Provencher et al. |
| 5,088,893 A | 2/1992 | Gilbert et al. |
| 5,092,821 A | 3/1992 | Gilbert et al. |
| 5,098,134 A | 3/1992 | Monckton |
| 5,114,312 A | 5/1992 | Stanislao |
| 5,126,047 A | 6/1992 | Martin et al. |
| 5,131,632 A | 7/1992 | Olson |
| 5,143,357 A | 9/1992 | Gilbert et al. |
| 5,145,322 A | 9/1992 | Senior, Jr. et al. |
| 5,152,631 A | 10/1992 | Bauer |
| 5,154,652 A | 10/1992 | Ecklesdafer |
| 5,158,440 A | 10/1992 | Cooper et al. |
| 5,162,858 A | 11/1992 | Shoji et al. |
| 5,165,858 A | 11/1992 | Gilbert et al. |
| 5,177,304 A | 1/1993 | Nagel |
| 5,191,154 A | 3/1993 | Nagel |
| 5,192,193 A | 3/1993 | Cooper et al. |
| 5,202,100 A | 4/1993 | Nagel et al. |
| 5,203,681 A | 4/1993 | Cooper |
| 5,209,641 A | 5/1993 | Hoglund et al. |
| 5,215,448 A | 6/1993 | Cooper |
| 5,268,020 A | 12/1993 | Claxton |
| 5,286,163 A | 2/1994 | Amra et al. |
| 5,298,233 A | 3/1994 | Nagel |
| 5,301,620 A | 4/1994 | Nagel et al. |
| 5,308,045 A | 5/1994 | Cooper |
| 5,310,412 A | 5/1994 | Gilbert et al. |
| 5,318,360 A | 6/1994 | Langer et al. |
| 5,322,547 A | 6/1994 | Nagel et al. |
| 5,324,341 A | 6/1994 | Nagel et al. |
| 5,330,328 A | 7/1994 | Cooper |
| 5,354,940 A | 10/1994 | Nagel |
| 5,358,549 A | 10/1994 | Nagel et al. |
| 5,358,697 A | 10/1994 | Nagel |
| 5,364,078 A | 11/1994 | Pelton |
| 5,369,063 A | 11/1994 | Gee et al. |
| 5,388,633 A | 2/1995 | Mercer, II et al. |
| 5,395,405 A | 3/1995 | Nagel et al. |
| 5,399,074 A | 3/1995 | Nose et al. |
| 5,407,294 A | 4/1995 | Giannini |
| 5,411,240 A | 5/1995 | Rapp et al. |
| 5,425,410 A | 6/1995 | Reynolds |
| 5,431,551 A | 7/1995 | Aquino et al. |
| 5,435,982 A | 7/1995 | Wilkinson |
| 5,436,210 A | 7/1995 | Wilkinson et al. |
| 5,443,572 A | 8/1995 | Wilkinson et al. |
| 5,454,423 A | 10/1995 | Tsuchida et al. |
| 5,468,280 A | 11/1995 | Areaux |
| 5,470,201 A | 11/1995 | Gilbert et al. |
| 5,484,265 A | 1/1996 | Horvath et al. |
| 5,489,734 A | 2/1996 | Nagel et al. |
| 5,491,279 A | 2/1996 | Robert et al. |
| 5,495,746 A | 3/1996 | Sigworth |
| 5,505,143 A | 4/1996 | Nagel |
| 5,509,791 A | 4/1996 | Turner |
| 5,537,940 A | 7/1996 | Nagel et al. |
| 5,543,558 A | 8/1996 | Nagel et al. |
| 5,555,822 A | 9/1996 | Loewen et al. |
| 5,558,501 A | 9/1996 | Wang et al. |
| 5,558,505 A | 9/1996 | Mordue et al. |
| 5,571,486 A | 11/1996 | Robert et al. |
| 5,585,532 A | 12/1996 | Nagel |
| 5,586,863 A | 12/1996 | Gilbert et al. |
| 5,591,243 A | 1/1997 | Colussi et al. |
| 5,597,289 A | 1/1997 | Thut |
| 5,613,245 A | 3/1997 | Robert |
| 5,616,167 A | 4/1997 | Eckert |
| 5,622,481 A | 4/1997 | Thut |
| 5,629,464 A | 5/1997 | Bach et al. |
| 5,634,770 A | 6/1997 | Gilbert et al. |
| 5,640,706 A | 6/1997 | Nagel et al. |
| 5,640,707 A | 6/1997 | Nagel et al. |
| 5,640,709 A | 6/1997 | Nagel et al. |
| 5,655,849 A | 8/1997 | McEwen et al. |
| 5,662,725 A | 9/1997 | Cooper |
| 5,676,520 A | 10/1997 | Thut |
| 5,678,244 A | 10/1997 | Shaw et al. |
| 5,678,807 A | 10/1997 | Cooper |
| 5,679,132 A | 10/1997 | Rauenzahn et al. |
| 5,685,701 A | 11/1997 | Chandler et al. |
| 5,690,888 A | 11/1997 | Robert |
| 5,695,732 A | 12/1997 | Sparks et al. |
| 5,716,195 A | 2/1998 | Thut |
| 5,717,149 A | 2/1998 | Nagel et al. |
| 5,718,416 A | 2/1998 | Flisakowski et al. |
| 5,735,668 A | 4/1998 | Klein |

| | | |
|---|---|---|
| 5,735,935 A | 4/1998 | Areaux |
| 5,741,422 A | 4/1998 | Eichenmiller et al. |
| 5,744,117 A | 4/1998 | Wilikinson et al. |
| 5,745,861 A | 4/1998 | Bell et al. |
| 5,772,324 A | 6/1998 | Falk |
| 5,776,420 A | 7/1998 | Nagel |
| 5,785,494 A | 7/1998 | Vild et al. |
| 5,842,832 A | 12/1998 | Thut |
| 5,858,059 A | 1/1999 | Abramovich et al. |
| 5,863,314 A | 1/1999 | Morando |
| 5,866,095 A | 2/1999 | McGeever et al. |
| 5,875,385 A | 2/1999 | Stephenson et al. |
| 5,935,528 A | 8/1999 | Stephenson et al. |
| 5,944,496 A | 8/1999 | Cooper |
| 5,947,705 A | 9/1999 | Mordue et al. |
| 5,951,243 A | 9/1999 | Cooper |
| 5,963,580 A | 10/1999 | Eckert |
| 5,992,230 A | 11/1999 | Scarpa et al. |
| 5,993,726 A | 11/1999 | Huang |
| 5,993,728 A | 11/1999 | Vild |
| 6,019,576 A | 2/2000 | Thut |
| 6,027,685 A | 2/2000 | Cooper |
| 6,036,745 A | 3/2000 | Gilbert et al. |
| 6,074,455 A | 6/2000 | van Linden et al. |
| 6,082,965 A | 7/2000 | Morando |
| 6,093,000 A | 7/2000 | Cooper |
| 6,096,109 A | 8/2000 | Nagel et al. |
| 6,113,154 A | 9/2000 | Thut |
| 6,123,523 A | 9/2000 | Cooper |
| 6,152,691 A | 11/2000 | Thut |
| 6,168,753 B1 | 1/2001 | Morando |
| 6,199,836 B1 | 3/2001 | Rexford et al. |
| 6,217,823 B1 | 4/2001 | Vild et al. |
| 6,231,639 B1 | 5/2001 | Eichenmiller |
| 6,250,881 B1 | 6/2001 | Mordue et al. |
| 6,254,340 B1 | 7/2001 | Vild et al. |
| 6,270,717 B1 | 8/2001 | Tremblay et al. |
| 6,280,157 B1 | 8/2001 | Cooper |
| 6,293,759 B1 | 9/2001 | Thut |
| 6,303,074 B1 | 10/2001 | Cooper |
| 6,345,964 B1 | 2/2002 | Cooper |
| 6,354,796 B1 | 3/2002 | Morando |
| 6,358,467 B1 | 3/2002 | Mordue |
| 6,371,723 B1 | 4/2002 | Grant et al. |
| 6,398,525 B1 | 6/2002 | Cooper |
| 6,439,860 B1 | 8/2002 | Greer |
| 6,451,247 B1 | 9/2002 | Mordue et al. |
| 6,457,940 B1 | 10/2002 | Lehman |
| 6,457,950 B1 | 10/2002 | Cooper et al. |
| 6,464,458 B2 | 10/2002 | Vild et al. |
| 6,497,559 B1 | 12/2002 | Grant |
| 6,500,228 B1 | 12/2002 | Klingensmith |
| 6,503,292 B2 | 1/2003 | Klingensmith et al. |
| 6,524,066 B2 | 2/2003 | Thut |
| 6,533,535 B2 | 3/2003 | Thut |
| 6,551,060 B2 | 4/2003 | Mordue et al. |
| 6,562,286 B1 | 5/2003 | Lehman |
| 6,679,936 B2 | 1/2004 | Quackenbush |
| 6,689,310 B1 | 2/2004 | Cooper |
| 6,709,234 B2 | 3/2004 | Gilbert et al. |
| 6,723,276 B1 | 4/2004 | Cooper |
| 6,805,834 B2 | 10/2004 | Thut |
| 6,843,640 B2 | 1/2005 | Mordue et al. |
| 6,848,497 B2 | 2/2005 | Sale et al. |
| 6,869,271 B2 | 3/2005 | Gilbert et al. |
| 6,869,564 B2 | 3/2005 | Gilbert et al. |
| 6,881,030 B2 | 4/2005 | Thut |
| 6,887,424 B2 | 5/2005 | Ohno et al. |
| 6,887,425 B2 * | 5/2005 | Mordue et al. ............... 266/235 |
| 6,902,696 B2 | 6/2005 | Klingensmith et al. |
| 7,083,758 B2 | 8/2006 | Tremblay |
| 7,131,482 B2 | 11/2006 | Vincent et al. |
| 7,157,043 B2 | 1/2007 | Neff |
| 7,279,128 B2 | 10/2007 | Kennedy et al. |
| 7,326,028 B2 | 2/2008 | Morando |
| 7,402,276 B2 | 7/2008 | Cooper |
| 7,470,392 B2 | 12/2008 | Cooper |
| 7,476,357 B2 | 1/2009 | Thut |
| 7,497,988 B2 | 3/2009 | Thut |
| 7,507,367 B2 | 3/2009 | Cooper |
| 8,110,141 B2 | 2/2012 | Cooper |
| 2001/0000465 A1 | 4/2001 | Thut |
| 2002/0185794 A1 | 12/2002 | Vincent |
| 2003/0047850 A1 | 3/2003 | Areaux |
| 2003/0201583 A1 | 10/2003 | Klingensmith |
| 2004/0050525 A1 | 3/2004 | Kennedy et al. |
| 2004/0076533 A1 | 4/2004 | Cooper |
| 2004/0115079 A1 | 6/2004 | Cooper |
| 2004/0262825 A1 | 12/2004 | Cooper |
| 2005/0013713 A1 | 1/2005 | Cooper |
| 2005/0013714 A1 | 1/2005 | Cooper |
| 2005/0013715 A1 | 1/2005 | Cooper |
| 2005/0053499 A1 | 3/2005 | Cooper |
| 2005/0077730 A1 | 4/2005 | Thut |
| 2005/0116398 A1 | 6/2005 | Tremblay |
| 2006/0180963 A1 | 8/2006 | Thut |
| 2007/0253807 A1 | 11/2007 | Cooper |
| 2008/0213111 A1 | 9/2008 | Cooper |
| 2008/0230966 A1 | 9/2008 | Cooper |
| 2011/0140319 A1 | 6/2011 | Cooper |

FOREIGN PATENT DOCUMENTS

| | | |
|---|---|---|
| CA | 2176475 | 5/1996 |
| CA | 2244251 | 12/1996 |
| CA | 2305865 | 2/2000 |
| CH | 392268 | 9/1965 |
| DE | 1800446 | 12/1969 |
| EP | 0168250 | 1/1986 |
| EP | 0665378 | 2/1995 |
| EP | 1019635 | 6/2006 |
| GB | 942648 | 11/1963 |
| GB | 1185314 | 3/1970 |
| GB | 2217784 | 3/1989 |
| JP | 58048796 | 3/1983 |
| JP | 63104773 | 5/1988 |
| MX | 227385 | 4/2005 |
| NO | 90756 | 1/1959 |
| SU | 416401 | 2/1974 |
| SU | 773312 | 10/1980 |
| WO | WO9808990 | 3/1998 |
| WO | WO9825031 | 6/1998 |
| WO | 9825031 | 11/1998 |
| WO | 0009889 | 2/2000 |
| WO | 0212147 | 2/2002 |

OTHER PUBLICATIONS

USPTO; Notice of Allowance dated Nov. 1, 2011 in U.S. Appl. No. 12/146,770.

USPTO; Office Action dated Nov. 4, 2011 in U.S. Appl. No. 12/264,416.

USPTO; Final Office Action dated Dec. 13, 2011 in U.S. Appl. No. 12/395,430.

USPTO; Final Office Action dated Dec. 16, 2011 in U.S. Appl. No. 13/047,719.

US 5,961,265, 10/1999, Kato (withdrawn).

"Response to Final Office Action and Request for Continued Examination for U.S. Appl. No. 09/275,627," Including Declarations of Haynes and Johnson, Apr. 16, 2001.

Document No. 504217: Excerpts from "Pyrotek Inc.'s Motion for Summary Judgment of Invalidity and Unenforceability of U.S. Patent No. 7,402,276," Oct. 2, 2009.

Document No. 505026: Excerpts from "MMEI's Response to Pyrotek's Motion for Summary Judgment of Invalidity or Enforceability of U.S. Patent No. 7,402,276," Oct. 9, 2009.

Document No. 507689: Excerpts from "MMEI's Pre-Hearing Brief and Supplemental Motion for Summary Judgment of Infringement of Claims 3-4, 15, 17-20, 26 and 28-29 of the '074 Patent and Motion for Reconsideration of the Validity of Claims 7-9 of the '276 Patent," Nov. 4, 2009.

Document No. 517158: Excerpts from "Reasoned Award," Feb. 19, 2010.

Document No. 525055: Excerpts from "Molten Metal Equipment Innovations, Inc.'s Reply Brief in Support of Application to Confirm Arbitration Award and Opposition to Motion to Vacate," May 12, 2010.

USPTO; Office Action dated Feb. 23, 1996 in U.S. Appl. No. 08/439,739.
USPTO; Office Action dated Aug. 15, 1996 in U.S. Appl. No. 08/439,739.
USPTO; Advisory Action dated Nov. 18, 1996 in U.S. Appl. No. 08/439,739.
USPTO; Advisory Action dated Dec. 9, 1996 in U.S. Appl. No. 08/439,739.
USPTO; Notice of Allowance dated Jan. 17, 1997 in U.S. Appl. No. 08/439,739.
USPTO; Office Action dated Jul. 22, 1996 in U.S. Appl. No. 08/489,962.
USPTO; Office Action dated Jan. 6, 1997 in U.S. Appl. No. 08/489,962.
USPTO; Interview Summary dated Mar. 4, 1997 in U.S. Appl. No. 08/489,962.
USPTO; Notice of Allowance dated Mar. 27, 1997 in U.S. Appl. No. 08/489,962.
USPTO; Office Action dated Sep. 23, 1998 in U.S. Appl. No. 08/759,780.
USPTO; Interview Summary dated Dec. 30, 1998 in U.S. Appl. No. 08/789,780.
USPTO; Notice of Allowance dated Mar. 17, 1999 in U.S. Appl. No. 08/789,780.
USPTO; Office Action dated Jul. 23, 1998 in U.S. Appl. No. 08/889,882.
USPTO; Office Action dated Jan. 21, 1999 in U.S. Appl. No. 08/889,882.
USPTO; Notice of Allowance dated Mar. 17, 1999 in U.S. Appl. No. 08/889,882.
USPTO; Office Action dated Feb. 26, 1999 in U.S. Appl. No. 08/951,007.
USPTO; Interview Summary dated Mar. 15, 1999 in U.S. Appl. No. 08/951,007.
USPTO; Office Action dated May 17, 1999 in U.S. Appl. No. 08/951,007.
USPTO; Notice of Allowance dated Aug. 27, 1999 in U.S. Appl. No. 08/951,007.
USPTO; Office Action dated Dec. 23, 1999 in U.S. Appl. No. 09/132,934.
USPTO; Notice of Allowance dated Mar. 9, 2000 in U.S. Appl. No. 09/132,934.
USPTO; Office Action dated Jan. 7, 2000 in U.S. Appl. No. 09/152,168.
USPTO; Notice of Allowance dated Aug. 7, 2000 in U.S. Appl. No. 09/152,168.
USPTO; Office Action dated Sep. 14, 1999 in U.S. Appl. No. 09/275,627.
USPTO; Office Action dated May 22, 2000 in U.S. Appl. No. 09/275,627.
USPTO; Office Action dated Nov. 14, 2000 in U.S. Appl. No. 09/275,627.
USPTO; Office Action dated May 21, 2001 in U.S. Appl. No. 09/275,627.
USPTO; Notice of Allowance dated Aug. 31, 2001 in U.S. Appl. No. 09/275,627.
USPTO; Office Action dated Jun. 15, 2000 in U.S. Appl. No. 09/312,361.
USPTO; Notice of Allowance dated Jan. 29, 2001 in U.S. Appl. No. 09/312,361.
USPTO; Office Action dated Jun. 22, 2001 in U.S. Appl. No. 09/569,461.
USPTO; Office Action dated Oct. 12, 2001 in U.S. Appl. No. 09/569,461.
USPTO; Office Action dated May 3, 2002 in U.S. Appl. No. 09/569,461.
USPTO; Advisory Action dated May 14, 2002 in U.S. Appl. No. 09/569,461.
USPTO; Office Action dated Dec. 4, 2002 in U.S. Appl. No. 09/569,461.
USPTO; Interview Summary dated Jan. 14, 2003 in U.S. Appl. No. 09/569,461.
USPTO; Notice of Allowance dated Jun. 24, 2003 in U.S. Appl. No. 09/569,461.
USPTO; Office Action dated Nov. 21, 2000 in U.S. Appl. No. 09/590,108.
USPTO; Office Action dated May 22, 2001 in U.S. Appl. No. 09/590,108.
USPTO; Notice of Allowance dated Sep. 10, 2001 in U.S. Appl. No. 09/590,108.
USPTO; Office Action dated Jan. 30, 2002 in U.S. Appl. No. 09/649,190.
USPTO; Office Action dated Oct. 4, 2002 in U.S. Appl. No. 09/649,190.
USPTO; Office Action dated Apr. 18, 2003 in U.S. Appl. No. 09/649,190.
USPTO; Notice of Allowance dated Nov. 21, 2003 in U.S. Appl. No. 09/649,190.
USPTO; Office Action dated Jun. 7, 2006 in U.S. Appl. No. 10/619,405.
USPTO; Final Office Action dated Feb. 20, 2007 in U.S. Appl. No. 10/619,405.
USPTO; Office Action dated Oct. 9, 2007 in U.S. Appl. No. 10/619,405.
USPTO; Final Office Action dated May 29, 2008 in U.S. Appl. No. 10/619,405.
USPTO; Interview Summary Aug. 22, 2008 in U.S. Appl. No. 10/619,405.
USPTO; Ex Parte Quayle dated Sep. 12, 2008 in U.S. Appl. No. 10/619,405.
USPTO; Interview Summary dated Oct. 16, 2008 in U.S. Appl. No. 10/619,405.
USPTO; Notice of Allowance dated Nov. 14, 2008 in U.S. Appl. No. 10/619,405.
USPTO; Office Action dated Mar. 20, 2006 in U.S. Appl. No. 10/620,318.
USPTO; Office Action dated Nov. 16, 2006 in U.S. Appl. No. 10/620,318.
USPTO; Final Office Action dated Jul. 25, 2007 in U.S. Appl. No. 10/620,318.
USPTO; Office Action dated Feb. 12, 2008 in U.S. Appl. No. 10/620,318.
USPTO; Final Office Action dated Oct. 16, 2008 in U.S. Appl. No. 10/620,318.
USPTO; Office Action dated Feb. 25, 2009 in U.S. Appl. No. 10/620,318.
USPTO; Final Office Action dated Oct. 8, 2009 in U.S. Appl. No. 10/620,318.
USPTO; Notice of Allowance Jan. 26, 2010 in U.S. Appl. No. 10/620,318.
USPTO; Office Action dated Nov. 15, 2007 in U.S. Appl. No. 10/773,101.
USPTO; Office Action dated Jun. 27, 2006 in U.S. Appl. No. 10/773,102.
USPTO; Office Action dated Mar. 6, 2007 in U.S. Appl. No. 10/773,102.
USPTO; Office Action dated Oct. 11, 2007 in U.S. Appl. No. 10/773,102.
USPTO; Interview Summary dated Mar. 18, 2008 in U.S. Appl. No. 10/773,102.
USPTO; Notice of Allowance Apr. 18, 2008 in U.S. Appl. No. 10/773,102.
USPTO; Office Action dated Jul. 24, 2006 in U.S. Appl. No. 10/773,105.
USPTO; Final Office Action dated Jul. 21, 2007 in U.S. Appl. No. 10/773,105.
USPTO; Office Action dated Oct. 9, 2007 in U.S. Appl. No. 10/773,105.
USPTO; Interview Summary dated Jan. 25, 2008 in U.S. Appl. No. 10/773,105.
USPTO; Office Action dated May 19, 2008 in U.S. Appl. No. 10/773,105.
USPTO; Interview Summary dated Jul. 21, 2008 in U.S. Appl. No. 10/773,105.

USPTO; Notice of Allowance dated Sep. 29, 2008 in U.S. Appl. No. 10/773,105.
USPTO; Office Action dated Jan. 31, 2008 in U.S. Appl. No. 10/773,118.
USPTO; Final Office Action dated Aug. 18, 2008 in U.S. Appl. No. 10/773,118.
USPTO; Interview Summary dated Oct. 16, 2008 in U.S. Appl. No. 10/773,118.
USPTO; Office Action dated Dec. 15, 2008 in U.S. Appl. No. 10/773,118.
USPTO; Final Office Action dated May 1, 2009 in U.S. Appl. No. 10/773,118.
USPTO; Office Action dated Jul. 27, 2009 in U.S. Appl. No. 10/773,118.
USPTO; Final Office Action dated Feb. 2, 2010 in U.S. Appl. No. 10/773,118.
USPTO; Interview Summary dated Jun. 4, 2010 in U.S. Appl. No. 10/773,118.
USPTO; Ex Parte Quayle Action dated Aug. 25, 2010 in U.S. Appl. No. 10/773,118.
USPTO; Notice of Allowance dated Nov. 5, 2010 in U.S. Appl. No. 10/773,118.
USPTO; Office Action dated Mar. 16, 2005 in U.S. Appl. No. 10/827,941.
USPTO; Final Office Action dated Nov. 7, 2005 in U.S. Appl. No. 10/827,941.
USPTO; Office Action dated Jul. 12, 2006 in U.S. Appl. No. 10/827,941.
USPTO; Final Office Action dated Mar. 8, 2007 in U.S. Appl. No. 10/827,941.
USPTO; Office Action dated Oct. 29, 2007 in U.S. Appl. No. 10/827,941.
USPTO; Office Action dated Sep. 26, 2008 in U.S. Appl. No. 11/413,982.
USPTO; Final Office Action dated Oct. 14, 2008 in U.S. Appl. No. 12/111,835.
USPTO; Office Action dated May 15, 2009 in U.S. Appl. No. 12/111,835.
USPTO; Office Action dated Nov. 3, 2008 in U.S. Appl. No. 12/120,200.
USPTO; Final Office Action dated May 28, 2009 in U.S. Appl. No. 12/120,200.
USPTO; Office Action dated Dec. 18, 2009 in U.S. Appl. No. 12/120,200.
USPTO; Final Office Action dated Jul. 9, 2010 in U.S. Appl. No. 12/120,200.
USPTO; Office Action dated Jan. 21, 2011 in U.S. Appl. No. 12/120,200.
USPTO; Final Office Action dated Jul. 26, 2011 in U.S. Appl. No. 12/120,200.
USPTO; Office Action dated Mar. 31, 2009 in U.S. Appl. No. 12/120,190.
USPTO; Final Office Action dated Dec. 4, 2009 in U.S. Appl. No. 12/120,190.
USPTO; Office Action dated Jun. 28, 2010 in U.S. Appl. No. 12/120,190.
USPTO; Final Office Action dated Jan. 6, 2011 in U.S. Appl. No. 12/120,190.
USPTO; Office Action dated Jun. 27, 2011 in U.S. Appl. No. 12/120,190.
USPTO; Office Action dated Apr. 13, 2009 in U.S. Appl. No. 12/264,416.
USPTO; Final Office Action dated Oct. 8, 2009 in U.S. Appl. No. 12/264,416.
USPTO; Office Action dated Feb. 1, 2010 in U.S. Appl. No. 12/264,416.
USPTO; Final Office Action dated Jun. 30, 2010 in U.S. Appl. No. 12/264,416.
USPTO; Office Action dated Mar. 17, 2011 in U.S. Appl. No. 12/264,416.
USPTO; Final Office Action dated Jul. 7, 2011 in U.S. Appl. No. 12/264,416.
USPTO; Office Action dated Apr. 27, 2009 in U.S. Appl. No. 12/146,788.
USPTO; Final Office Action dated Oct. 15, 2009 in U.S. Appl. No. 12/146,788.
USPTO; Office Action dated Feb. 16, 2010 in U.S. Appl. No. 12/146,788.
USPTO; Final Office Action dated Jul. 13, 2010 in U.S. Appl. No. 12/146,788.
USPTO; Office Action dated Apr. 19, 2011 in U.S. Appl. No. 12/146,788.
USPTO; Notice of Allowance dated Aug. 19, 2011 in U.S. Appl. No. 12/146,788.
USPTO; Office Action dated May 22, 2009 in U.S. Appl. No. 12/369,362.
USPTO; Final Office Action dated Dec. 14, 2009 in U.S. Appl. No. 12/369,362.
USPTO; Office Action dated Jun. 16, 2009 in U.S. Appl. No. 12/146,770.
USPTO; Final Office Action dated Feb. 24, 2010 in U.S. Appl. No. 12/146,770.
USPTO; Office Action dated Jun. 9, 2010 in U.S. Appl. No. 12/146,770.
USPTO; Office Action dated Nov. 18, 2010 in U.S. Appl. No. 12/146,770.
USPTO; Final Office Action dated Apr. 4, 2011 in U.S. Appl. No. 12/146,770.
USPTO; Notice of Allowance dated Aug. 22, 2011 in U.S. Appl. No. 12/146,770.
USPTO; Office Action dated Dec. 11, 2009 in U.S. Appl. No. 11/766,617.
USPTO; Office Action dated Mar. 8, 2010 in U.S. Appl. No. 11/766,617.
USPTO; Final Office Action dated Sep. 20, 2010 in U.S. Appl. No. 11/766,617.
USPTO; Office Action dated Mar. 1, 2011 in U.S. Appl. No. 11/766,617.
USPTO; Office Action dated Sep. 22, 2011 in U.S. Appl. No. 11/766,617.
USPTO; Final Office Action dated Jun. 11, 2010 in U.S. Appl. No. 12/395,430.
USPTO; Office Action dated Nov. 24, 2010 in U.S. Appl. No. 12/395,430.
USPTO; Final Office Action dated Apr. 6, 2011 in U.S. Appl. No. 12/395,430.
USPTO; Office Action dated Aug. 18, 2011 in U.S. Appl. No. 12/395,430.
USPTO; Office Action dated Sep. 29, 2010 in U.S. Appl. No. 12/758,509.
USPTO; Final Office Action dated May 11, 2011 in U.S. Appl. No. 12/758,509.
USPTO; Office Action dated Sep. 22, 2011 in U.S. Appl. No. 12/880,027.
USPTO; Office Action dated Aug. 25, 2011 in U.S. Appl. No. 13/047,747.
USPTO; Office Action dated Aug. 25, 2011 in U.S. Appl. No. 13/047,719.
USPTO; Office Action dated Aug. 27, 2001 in U.S. Appl. No. 90/005,910.
CIPO; Office Action dated Dec. 4, 2001 in Application No. 2,115,929.
CIPO; Office Action dated Apr. 22, 2002 in Application No. 2,115,929.
CIPO; Notice of Allowance dated Jul. 18, 2003 in Application No. 2,115,929.
CIPO; Office Action dated Jun. 30, 2003 in Application No. 2,176,475.
CIPO; Notice of Allowance dated Sep. 15, 2004 in Application No. 2,176,475.
CIPO; Office Action dated May 29, 2000 in Application No. 2,242,174.
CIPO; Office Action dated Feb. 22, 2006 in Application No. 2,244,251.

CIPO; Office Action dated Mar. 27, 2007 in Application No. 2,244,251.
CIPO; Notice of Allowance dated Jan. 15, 200 in Application No. 2,244,251.
CIPO; Office Action dated Sep. 18, 2002 in Application No. 2,305,865.
CIPO; Notice of Allowance dated May 2, 2003 in Application No. 2,305,865.
EPO; Examination Report dated Oct. 6, 2008 in Application No. 08158682.
EPO; Office Action dated Jan. 26, 2010 in Application No. 08158682.
EPO; Office Action dated Feb. 15, 2011 in Application No. 08158682.
EPO; Search Report dated Nov. 9, 1998 in Application No. 98112356.
EPO; Office Action dated Feb. 6, 2003 in Application No. 99941032.
EPO; Office Action dated Aug. 20, 2004 in Application No. 99941032.
PCT; International Search Report or Declaration dated Nov. 15, 1999 in Application No. PCT/US1999/18178.
PCT; International Search Report or Declaration dated Oct. 9, 1998 in Application No. PCT/US1999/22440.
USPTO; Office Action dated Jan. 27, 2012 in U.S. Appl. No. 11/766,617.
USPTO; Notice of Allowance dated May 15, 2012 in U.S. Appl. No. 11/766,617.
USPTO; Supplemental Notice of Allowance dated Jul. 31, 2012 in U.S. Appl. No. 11/766,617.
USPTO; Notice of Allowance dated Feb. 6, 2012 in U.S. Appl. No. 12/120,190.
USPTO; Final Office Action dated Feb. 3, 2012 in U.S. Appl. No. 12/120,200.
USPTO; Final Office Action dated Jun. 8, 2012 in U.S. Appl. No. 12/264,416.
USPTO; Advisory Action dated Feb. 22, 2012 in U.S. Appl. No. 12/395,430.
USPTO; Office Action dated Feb. 1, 2012 in U.S. Appl. No. 12/853,201.
USPTO; Final Office Action dated Jul. 3, 2012 in U.S. Appl. No. 12/853,201.
USPTO; Office Action dated Feb. 27, 2012 in U.S. Appl. No. 12/853,253.
USPTO; Ex Parte Quayle Action dated Jun. 27, 2012 in U.S. Appl. No. 12/853,253.
USPTO; Office Action dated Mar. 12, 2012 in U.S. Appl. No. 12/853,255.
USPTO; Final Office Action dated Jul. 24, 2012 in U.S. Appl. No. 12/853,255.
USPTO; Office Action dated May 29, 2012 in U.S. Appl. No. 12/878,984.
USPTO; Final Office Action dated Feb. 16, 2012 in U.S. Appl. No. 12/880,027.
USPTO; Final Office Action dated Feb. 7, 2012 in U.S. Appl. No. 13/047,747.
USPTO; Notice of Allowance dated Apr. 18, 2012 in U.S. Appl. No. 13/047,747.
USPTO; Office Action dated Apr. 18, 2012 in U.S. Appl. No. 13/252,145.
CIPO; Notice of Allowance dated Jan. 15, 2008 in Application No. 2,244,251.

* cited by examiner

SHAFT AND POST TENSIONING DEVICE

This application claims priority to U.S. Provisional Application No. 61/232,390 filed on Aug. 7, 2009 to Cooper and entitled "Shaft and Post Tensioning Device."

BACKGROUND OF THE INVENTION

1. Field of the Invention

The invention relates to a molten metal pump component that has tension applied to it so that the component is more resistant to breakage. More particularly, the invention relates to at least one molten metal pump component comprising a tension rod inside a structural refractory outer core material.

2. Description of the Related Art

As used herein, the term "molten metal" means any metal or combination of metals in liquid form, such as aluminum, copper, iron, zinc and alloys thereof. The term "gas" means any gas or combinations of gases, including argon, nitrogen, chlorine, fluorine, Freon, and helium, which can be released into molten metal.

Known pumps for pumping molten metal (also called "molten metal pumps") include a pump base (also called a housing or casing), one or more inlets, an inlet being an opening to allow molten metal to enter a pump chamber (and is usually an opening in the pump base that communicates with the pump chamber), a pump chamber, which is an open area formed within the pump base, and a discharge, which is a channel or conduit communicating with the pump chamber (in an axial pump the pump chamber and discharge can be the same structure or different areas of the same structure) leading from the pump chamber to the molten metal bath in which the pump base is submerged. A rotor, also called an impeller, is mounted in the pump chamber and is connected to a drive shaft. The drive shaft is typically a motor shaft coupled to a rotor shaft, wherein the motor shaft has two ends, one end being connected to a motor and the other end being coupled to the rotor shaft. The rotor shaft also has two ends, wherein one end is coupled to the motor shaft and the other end is connected to the rotor. Often, the rotor shaft is comprised of graphite, the motor shaft is comprised of steel, and the two are coupled by a coupling, which is usually comprised of steel.

As the motor turns the drive shaft, the drive shaft turns the rotor and the rotor pushes molten metal out of the pump chamber, through the discharge, which can be an axial, tangential or any type of discharge, and into the molten metal bath. Most molten metal pumps are gravity fed, wherein gravity forces molten metal through the inlet (either a top inlet, bottom inlet or both) and into the pump chamber as the rotor pushes molten metal out of the pump chamber.

Molten metal pump casings and rotors usually employ a bearing system comprising ceramic rings wherein there are one or more rings on the rotor that align with rings in the pump chamber (such as rings at the inlet, which is usually at the top of the pump chamber and/or bottom of the pump chamber) when the rotor is placed in the pump chamber. The purpose of the bearing system is to reduce damage to the soft, graphite components, particularly the rotor and pump chamber wall, during pump operation. Known bearing systems are described in U.S. Pat. Nos. 5,203,681, 5,951,243 and 6,093,000 to Cooper, the respective disclosures of which are incorporated herein by reference. Further, U.S. Pat. No. 2,948,524 to Sweeney et al., U.S. Pat. No. 4,169,584 to Mangalick, U.S. Pat. No. 5,203,681 to Cooper and U.S. Pat. No. 6,123,523 to Cooper (the disclosure of U.S. Pat. No. 6,123,523 to Cooper is also incorporated herein by reference) all disclose molten metal pumps. U.S. Pat. No. 6,303,074 to Cooper discloses dual-flow rotors and its disclosure is incorporated herein by reference.

Furthermore, U.S. Pat. No. 7,402,276 to Cooper entitled "Pump With Rotating Inlet" (also incorporated by reference) discloses, among other things, a pump having an inlet and rotor structure (or other displacement structure) that rotate together as the pump operates in order to alleviate jamming.

The materials forming the components that contact the molten metal bath should remain relatively stable in the bath. Structural refractory materials, such as graphite or ceramics, that are resistant to disintegration by corrosive attack from the molten metal can be used. As used herein "ceramics" or "ceramic" refers to any oxidized metal (including silicon) or carbon-based material, excluding graphite, capable of being used in the environment of a molten metal bath. "Graphite" means any type of graphite suitable for molten metal pump components, whether or not chemically treated. Graphite is particularly suitable for being formed into pump components because it is (a) relatively soft and easy to machine, (b) not as brittle as ceramics and less prone to breakage, and (c) less expensive than ceramics.

Three basic types of pumps for pumping molten metal, such as molten aluminum, are utilized: circulation pumps, transfer pumps and gas-release pumps, although the present invention could be used with any type of device used in the processing of molten metal. Circulation pumps are used to circulate the molten metal within a bath, thereby generally equalizing the temperature of the molten metal. Most often, circulation pumps are used in a reverbatory furnace having an external well. The well is usually an extension of a charging well where scrap metal is charged (i.e., added).

Transfer pumps are generally used to transfer molten metal from the external well of a reverbatory furnace to a different location such as a ladle or another furnace. Examples of transfer pumps are disclosed in U.S. Pat. No. 6,345,964 B1 to Cooper, the disclosure of which is incorporated herein by reference, and U.S. Pat. No. 5,203,681.

Gas-release pumps, such as gas-transfer pumps, circulate molten metal while releasing a gas into the molten metal. In the purification of molten metals, particularly aluminum, it is frequently desired to remove dissolved gases such as hydrogen, or dissolved metals, such as magnesium, from the molten metal. As is known by those skilled in the art, the removing of dissolved gas is known as "degassing" while the removal of magnesium is known as "demagging." Gas-release pumps can be used for either of these purposes or for any other application for which it is desirable to introduce gas into molten metal.

One problem with standard molten metal components, especially elongated ones such as support posts and impeller shafts is that they, are susceptible to breakage, for example, if struck against a hard surface while being moved.

SUMMARY OF THE INVENTION

In accordance with the invention, a device is disclosed that increases the strength of components used in molten metal processing. The system comprises a component for use in molten metal, wherein the component has at least one tension rod positioned inside an outer core. The tension rod is capable of applying tension (or compressive force) to the outer core in order to strengthen it and help prevent the outer core from breaking.

Preferably, the component is elongated, such as a support post or impeller shaft, and includes at least one post tension rod positioned within an outer core made of structural refractory material, such as graphite, graphitized carbon, clay-bonded graphite, carbon-bonded graphite, silicon carbide, ceramics, or the like. The outer core has a first end and a second end and the tension rod includes a first end and a second end. At least one end of the tension rod can extend beyond and terminate outside of the one end of the outer core. Either the first end or the second end of the tension rod can be tightened against an end cap or a superstructure. This puts the outer core under compression, and makes the outer core more resistant to breakage. By using the system of the invention, it is also possible to use a thinner cross-sectional outer core wall, thereby reducing material costs.

Both the forgoing general description and the following detailed description are exemplary and explanatory only and are not restrictive of the invention as claimed.

DETAILED DESCRIPTION OF THE PREFERRED EMBODIMENTS

Figure 1A:
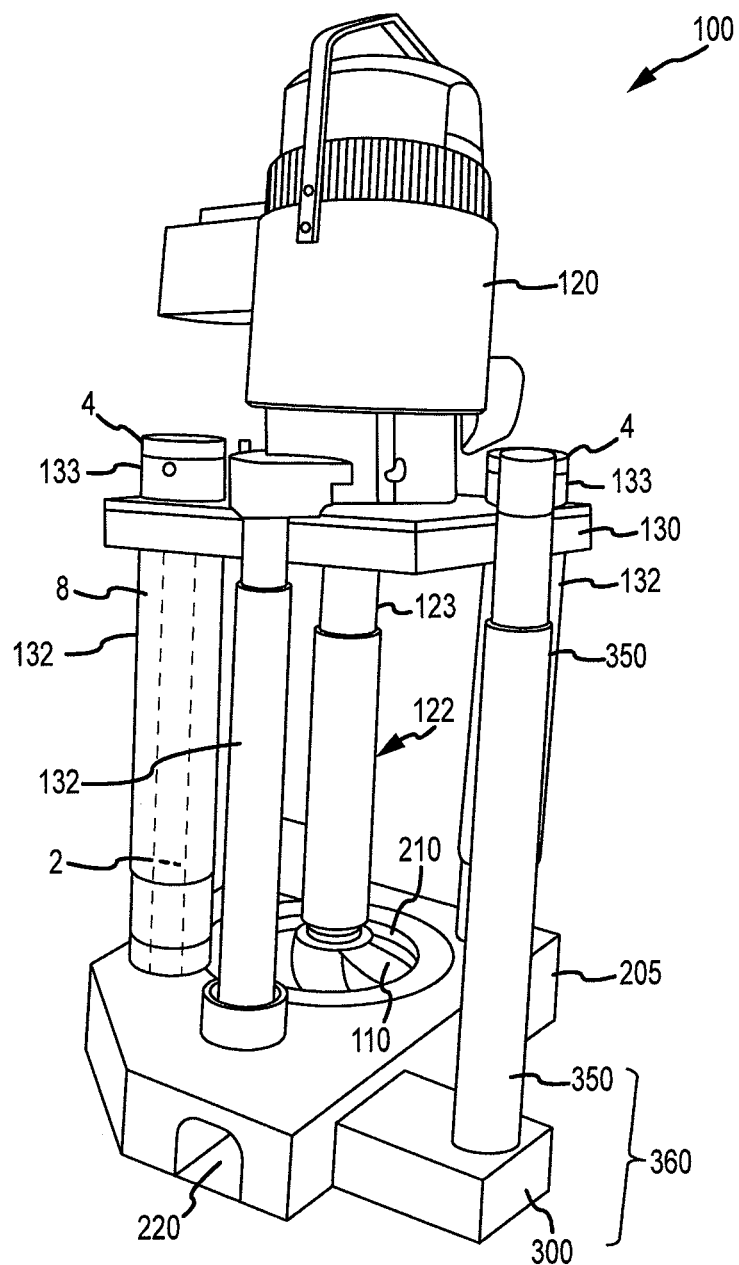
FIG. 1A depicts a molten metal pump with modified support posts according to one embodiment of the invention.

Reference will now be made in detail to the present exemplary embodiments of the invention, examples of which are illustrated in the accompanying drawings. FIG. 1A depicts a molten metal pump 100 according to the invention. When in operation, pump 100 is typically positioned in a molten metal bath in a pump well, which is typically part of the open well of a reverbatory furnace. Pump 100 includes motor 120, superstructure 130, support posts 132, drive shaft 122, rotor 110, base 205, gas-transfer foot 300 and gas-transfer tube 350.

The components of pump 100 that are exposed to the molten metal (such as support posts 132, outer core 8, drive shaft 122, rotor 110, base 205, gas-transfer foot 300 and gas-transfer tube 350) are preferably formed of structural refractory materials (previously described), which are resistant to degradation in the molten metal.

Pump 100 need not be limited to the structure depicted in FIG. 1A, but can be any structure or device for pumping or otherwise conveying molten metal, such as the pump disclosed in U.S. Pat. No. 5,203,681 to Cooper, or an axial pump having an axial, rather than tangential, discharge. Preferred pump 100 has a pump base 205 that is submersed in a molten metal bath when pump 100 is in use. Pump base 205 preferably includes a generally nonvolute pump chamber 210, such as a cylindrical pump chamber or what has been called a "cut" volute, although pump base 205 can have any shape pump chamber suitable of being used, including a volute-shaped chamber. Chamber 210 can be constructed to have only one opening (or "inlet"), either in its top or bottom. Generally, pump chamber 210 has two coaxial openings, one at the top of base 205 and one at the bottom, of the same diameter and usually one (which is usually the bottom opening) is blocked by a flow blocking plate mounted on, or formed as part of, rotor 110. Base 205 further includes a tangential discharge 220 (although another type of discharge, such as an axial discharge can be used) in fluid communication with chamber 210. As rotor 110 rotates, molten metal is pushed out of chamber 210 through the discharge.

One or more support posts 132 connect base 205 to a superstructure 130 of pump 100 thus supporting superstructure 130, although any structure or structures capable of supporting superstructure 130 can be used. In this embodiment, at least one support post 132 comprises a tension rod 2 inside of an outer core 8.

Tension rod 2 is preferably constructed of a material, such as steel, with a high capacity for resisting the forces that bend or pull apart. The tension rod 2 is pre-loaded with internal forces during the manufacturing process to counteract the anticipated external loads it will encounter.

Where possible, it is preferable that the tension rod 2 is formed from material(s) having the same or similar thermal coefficient of expansion as graphite so that the tension rod 2 will expand and contract at a rate comparable to other components in the system. In one embodiment, the tension rod 2 is formed from metal, such as steel. Tension rod 2 can be any size, shape, and configuration, such as an elongate metal rod or an elongate metal cable. The tension rod 2 can be one single unit, multiple rods, or a bundle of rods and/or cables. In the case where multiple rods 2 are used in conjunction with the present invention, a portion of the rods 2 may be in contact with each other and/or a portion of the rods 2 can be positioned so that they do not contact each other (as shown in FIG. 4). Placing rods 2 together can help to strengthen the post tensioning system. Alternatively, providing spacing between the rods 2 allows the rods 2 to flex or deform, as well as to allow fasteners to be more easily attached to the rods 2. The tension rod 2 preferably runs the entire length of the component to minimize the connection of multiple sections of elements, though a shorter length can be utilized if desired.

The tension rod 2 of the present exemplary embodiment is cylindrical, having a circular cross-section, however the tension rod in alternate embodiments of the present invention may be of any suitable desired size, shape, and configuration. For example, the tension rod 2 may have a triangular, rectangular, or other polygonal cross-section.

The tension rod 2 is positioned at least partially inside of the outer core 8. In one embodiment, the tension rod 2 is positioned in the approximate center of the outer core 8. The outer core 8 is preferably made of structural refractory materials, which are resistant to degradation in the molten metal. The outer core 8 is preferably designed to protect the tension rod 2 from the caustic and thermal effects of the molten metal bath. Therefore, the outer core covers at least a portion of the tension rod 2 intended to be submerged in the molten metal bath. However, the tension rod 2 can extend beyond the outer core 8. As shown FIG. 1A, the tension rod 2 terminates at end caps 4 one either side of the outer core 8 (see FIGS. 1B and 1C). The outer core 8 may be shaped as desired. For instance, it may be an approximate constant diameter, flanged, or take an irregular or regular geometric shape.

In the preferred embodiment, post clamps 133 secure posts 132 to superstructure 130. A preferred post clamp and preferred support posts are disclosed in a copending U.S. application Ser. No. 10/773,118 entitled "Support Post System For Molten Metal Pump," invented by Paul V. Cooper, and filed on Feb. 4, 2004, the disclosure of which is incorporated herein by reference. However, any system or device for securing posts to superstructure 130 can be used.

A motor 120, which can be any structure, system or device suitable for driving pump 100, but is preferably an electric or pneumatic motor, is positioned on superstructure 130 and is connected to an end of a drive shaft 122. A drive shaft 122 can be any structure suitable for rotating an impeller, and preferably comprises a motor shaft (not shown) coupled to a rotor shaft. The motor shaft has a first end and a second end, wherein the first end of the motor shaft connects to motor 120 and the second end of the motor shaft connects to the coupling. Rotor shaft 123 has a first end and a second end, wherein the first end is connected to the coupling and the second end is connected to rotor 110 or to an impeller according to the invention. Though rotor shaft 123 is not depicted utilizing the post tension device it would be possible to do so. A preferred coupling, rotor shaft and connection between the rotor shaft and rotor 110 are disclosed in a copending application entitled "Molten Metal Pump Components," invented by Paul V. Cooper and filed on Feb. 4, 2004, the disclosure of which is incorporated herein by reference.

The preferred rotor 110 is disclosed in U.S. Pat. No. 7,402,276 to Cooper, filed on Feb. 4, 2004 and entitled "Pump With Rotating Inlet", the disclosure of which is incorporated herein by reference. However, rotor 110 can be any rotor suitable for use in a molten metal pump and the term "rotor," as used in connection with this invention, means any device or rotor used in a molten metal pump chamber to displace molten metal.

Gas-transfer foot 300 and gas-transfer tube 350 combined forms a gas transfer assembly 360. Gas-transfer foot 300 is positioned next to (and can be attachable to) base 205 so that a gas outlet port 320 (shown in FIG. 1B) of the gas-transfer foot is in communication with a gas-release opening (not shown in FIG. 1A) in the base. Gas is fed into the gas source end of gas-transfer tube 350 which flows into the gas-transfer foot and then into the flow of molten metal within base 205.

Figure 1B:
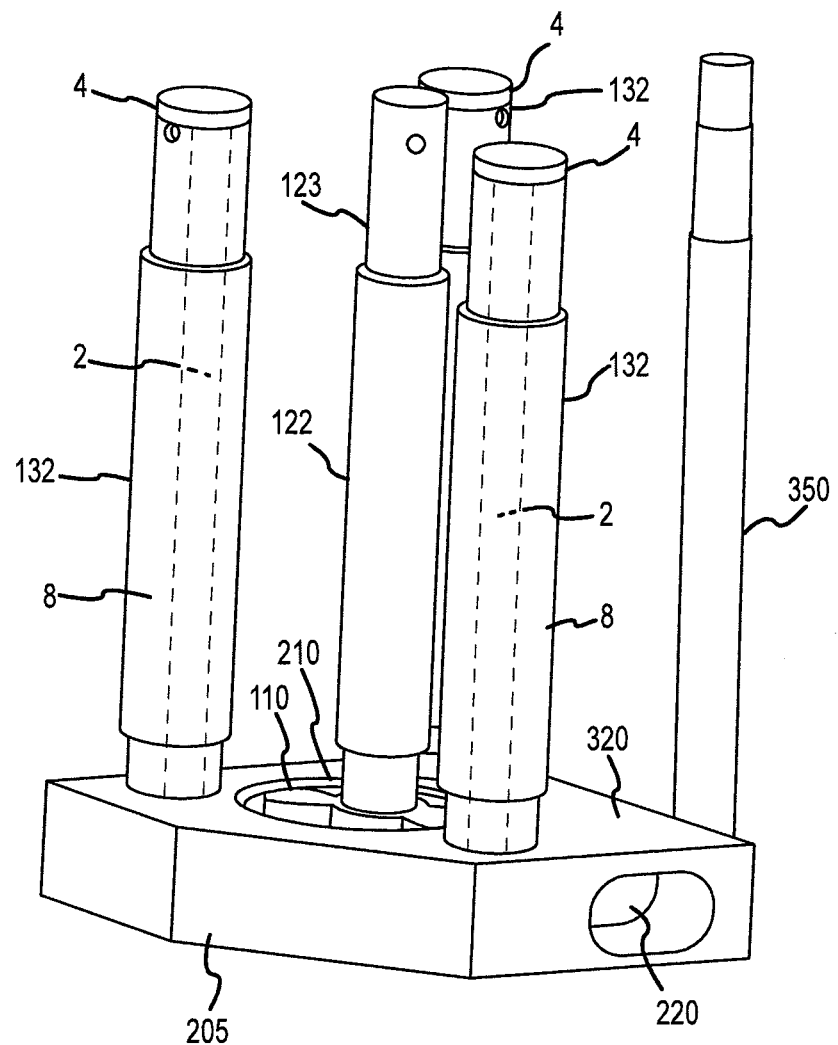
FIG. 1B depicts a different view of the molten metal pump with modified support posts shown in FIG. 1A.

FIG. 1B depicts the molten metal pump shown in FIG. 1A including the top cap 4 mounted on the top surface of the support post 132. The tension rod or rods 2 are mounted to the top cap 4 through any suitable means, such as one or more of the following of: cement, threaded coupling, fasteners, or a combination of techniques. In the present embodiment, the top caps 4 are mounted to a threaded end of the tension rod 2 and cement is added to permanently fix the connection. The tension rod 2 can alternatively extend beyond the top cap 4. The top cap 4 is sized to restrain the tension rod 2 in position and put force on the tension rod 2. The top cap 4 can be any geometric shape. In the present embodiment, a cylindrical top cap 4 is utilized. The top cap 4 can be made of any suitable material. However, in the present embodiment, the top cap 4 is made of the same material as the molten metal pump superstructure. The tension rod 2 end can be free standing or be mounted to an alternative surface such as the superstructure. Top caps 4 provide compression to the outer core 8 thus increasing the component tensile strength.

Using the internal rod 2 or other tensioning device, the compressive force may be supplied in any suitable manner. First, the tensioning devices must be threaded, cemented, or otherwise anchored inside of the outer cover (e.g., support post 132) and at least one end of the tube tensioning devices must be accessible. As cap (e.g., cap 4) or nut or other device can be threaded onto the accessible end and as such device is tightened it asserts compressive force onto the outer cover.

Figure 1C:
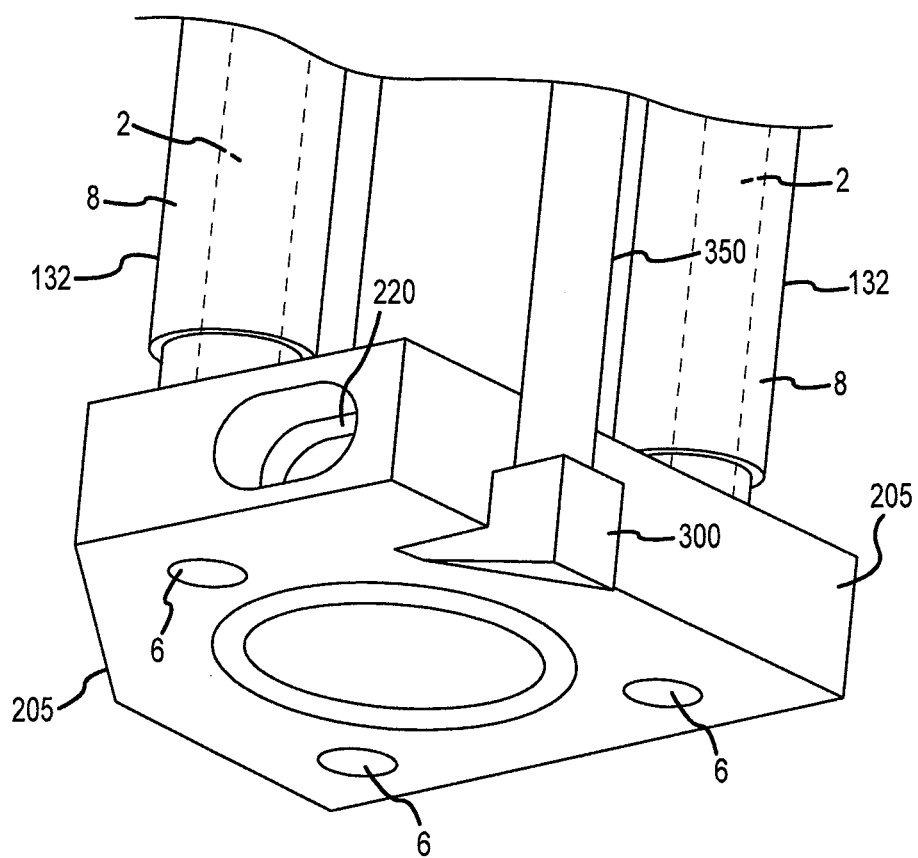
FIG. 1C depicts a bottom isometric view of the molten metal pump with support posts shown in FIGS. 1A and 1B.

As shown in FIG. 1C, the tension rod 2 can be mounted to bottom caps 6 similar to the top caps 4 shown in FIG. 1B. Alternatively, the tension rod 2 can extend beyond the base 205 without utilizing bottom caps 6. In the present embodiment, the bottom caps 6 are mounted to a threaded end of the tension rod 2 and cement is added to permanently fix the connection. The bottom cap 6 is sized to restrain the tension rod 2 in position and put force on the tension rod 2. The bottom cap 6 can be made of any suitable material. However, in the present embodiment, the bottom cap 6 is made of the same material as the base 205.

Figure 2A:
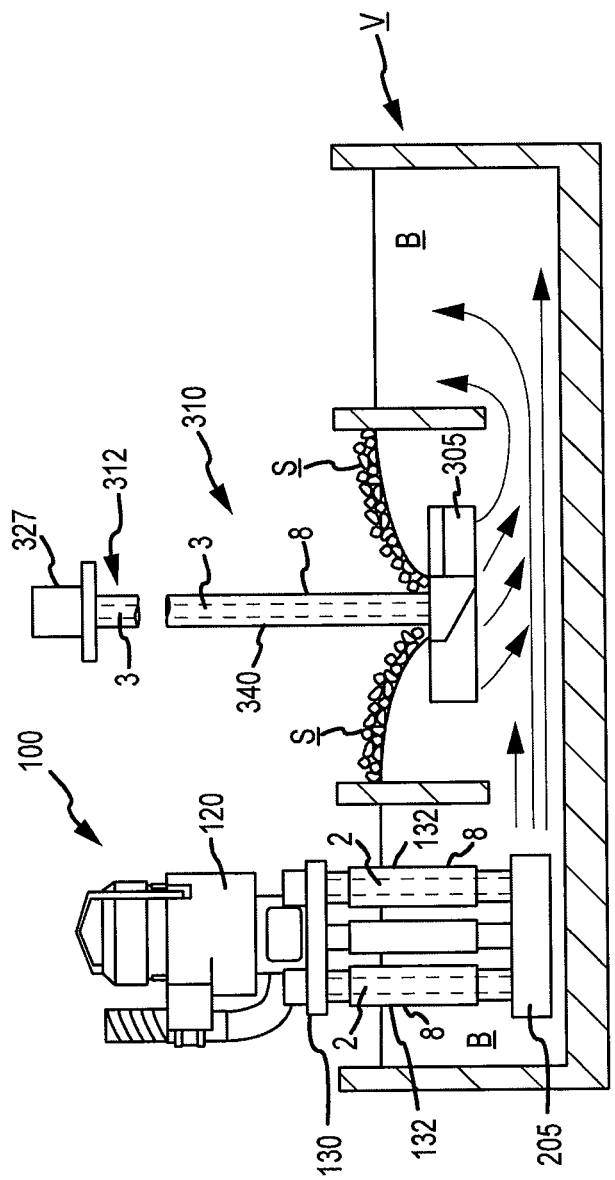
FIG. 2A is a side view of a scrap melter system comprising a scrap melter, a vessel, an impeller and an impeller shaft according to another embodiment the invention.
Figure 2B:
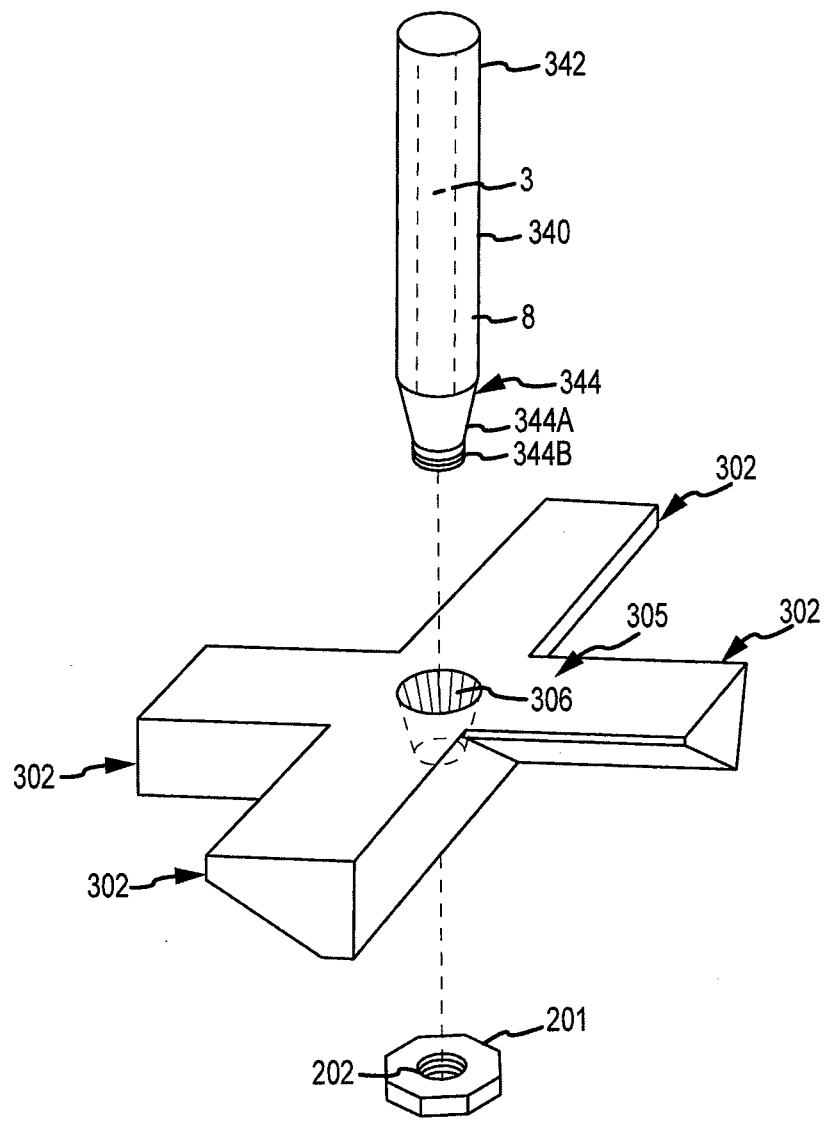
FIG. 2B shows an exploded, perspective view of an assembly according to the system shown in FIG. 2A, including a drive shaft, the impeller, the impeller shaft and a nut.

FIG. 2B shows yet another embodiment of the invention, scrap S submerged in a molten metal bath B. All of the components of scrap melter 310 exposed to molten metal bath B are preferably formed from oxidation-resistant graphite or other material suitable for use in molten metal.

In this embodiment, a drive source 327 is connected to impeller 305 by any structure suitable to transfer driving force from source 327 to impeller 305. Drive source 327 is preferably an electric, pneumatic or hydraulic motor although, as used herein, the term drive source refers to any device or devices capable of rotating impeller 305.

A drive shaft 312 is preferably comprised of a motor drive shaft (not shown) connected to an impeller drive shaft 340. In this embodiment, the component, the impeller drive shaft comprises a tension rod 3 inside of an outer core 8. As mentioned above, the tension rod or rods 3 are constructed of any suitable material. In this embodiment, metal is used for the tension rod or rods 3, such as steel. The outer core 8 is made from structural refractory materials. The outer core 8 can be bonded to the tension rod 3 through any suitable manufacturing means, such as cement or pressure fit. The tension rod 3 terminates on one end at top cap 4. Top cap 4 presents a compression on the component. The top cap 4 may be designed to accept a second end of the motor shaft through a coupling member. The outer core can take any suitable shape. For instance, it may be shaped to suitably accept an impeller or other molten metal pump component. In this embodiment, the tension rod 3 is positioned in the center of the outer core 8. The motor drive shaft has a first end and a second end, the first end being connected to drive source 327 by any suitable means and which is effectively the first end of drive shaft 312 in the preferred embodiment. An impeller shaft 340 has a first end 342 and a second end 344. The preferred structure for connecting the motor drive shaft to impeller drive shaft 340 is a coupling. The coupling preferably has a first coupling member and a second coupling member. The first end 342 of impeller shaft 340 is connected to the second end of the motor shaft, preferably by the coupling, wherein the first end 342 of drive shaft 340 is connected to the second coupling member and the second end of the motor drive shaft is connected to the first coupling member. The motor drive shaft drives the coupling, which, in turn, drives impeller drive shaft 340. Preferably, the coupling and first end 342 of the impeller shaft 340 are connected without the use of connecting threads. As shown in FIG. 2B, an impeller shaft 340 has a first end 342 and a second end 344. Second end 344 of impeller drive shaft 340 preferably has a tapered section 344A that is received in the tapered bore of the preferred embodiment of connecting portion 306. End 344 also preferably has a threaded section 344B that extends below bottom surface of impeller 305 when section 344A is received in connecting portion 306. In this preferred embodiment, a nut 201, that has a threaded opening 202, is screwed onto section 344B to retain impeller 305 on end 344 of rotor drive shaft 340. Nut 201 and section 344B preferably have 4"-4½" U.N.C. threads. Nut 201 is preferably a hex head nut having an overall diameter of approximately 7".

Figure 3:
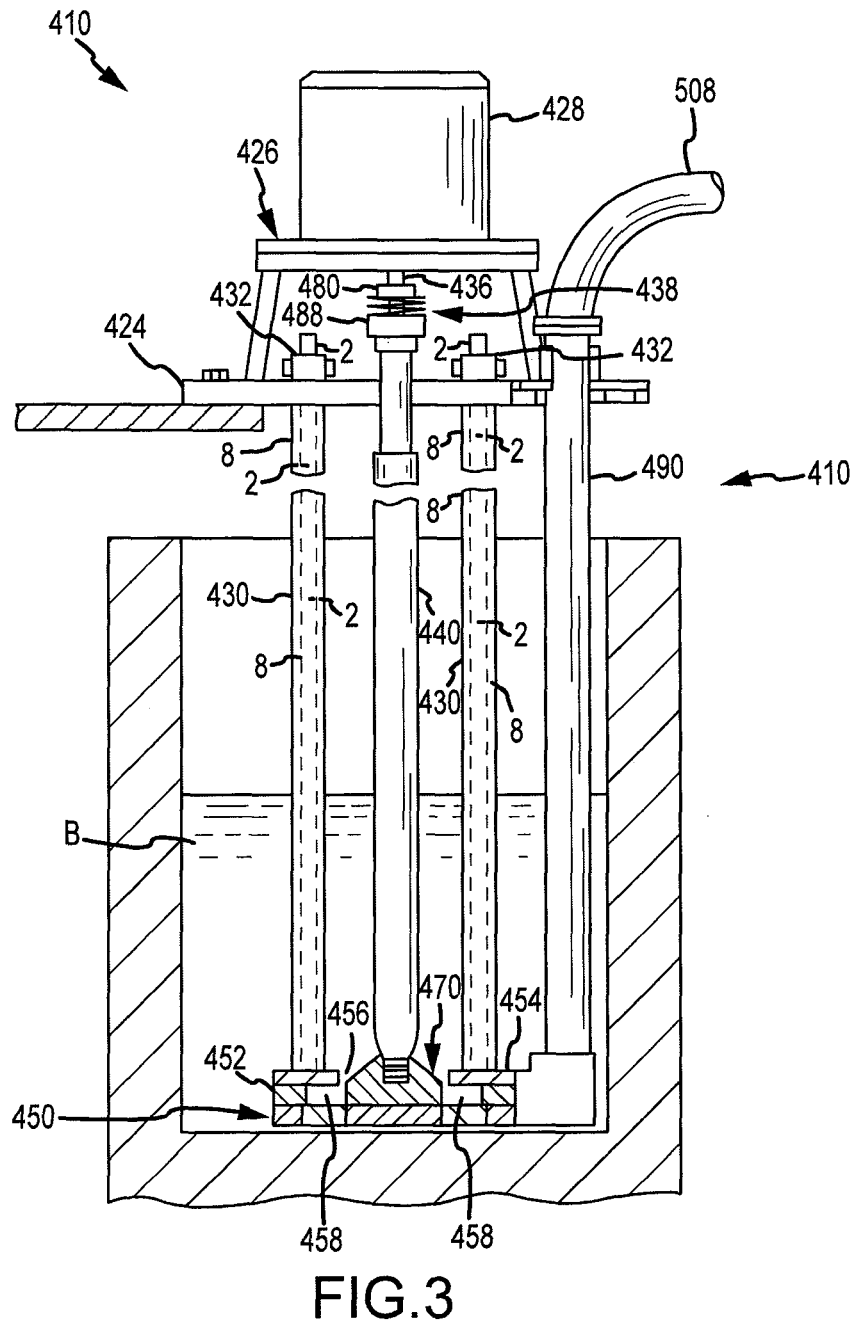
FIG. 3 is a front, partial-sectional view of another molten metal pump in accordance with an embodiment of the invention having tension rod aided support posts that do not terminate inside the outer core.

FIG. 3 shows another pumping device 410 submerged in a metallic bath B. Device 410 has a superstructure 420 and a base 450. Superstructure 420 is positioned outside of bath B when device 410 is operating and generally comprises a mounting plate 424 that supports a motor mount 426. A motor 428 is mounted to mount 426. Motor 428 is preferably electric or pneumatic although, as used herein, the term motor refers to any device capable of driving a rotor 470.

Superstructure 420 is connected to base 450 by one or more support posts 430. In this embodiment, support posts 430 comprise tension rod 2 inside of an outer core 8 as described in FIGS. 1 and 2. In this embodiment, the tension rod 2 terminates beyond the outer core 8. Preferably, posts 430 extend through openings (not shown) in plate 424 and are secured by post clamps 432, which are preferably bolted to the top surface (preferred) or lower surface of plate 424. Tension rod 2 can be secured to a portion of the superstructure 420 through any suitable means, such as clamping, cementing, welding or other similar mounting. In the present embodiment, the tension rods 2 are clamped and held in place through pressure.

A motor drive shaft 36 extends from motor 428. A coupling 438 has a first coupling member 480, attached to drive shaft 436, and a second coupling member 485, attached to a rotor shaft 440. Motor drive shaft 36 drives coupling 438 which, in turn, drives rotor shaft 440. Preferably neither coupling 438 nor shaft 440 have any connecting threads.

Base 450 is preferably formed from graphite or other suitable material. Base 450 includes a top surface 454 and an input port 456, preferably formed in top surface 454. A pump chamber 458, which is in communication with port 456, is a cavity formed within housing 450. A discharge is preferably formed tangentially with, and is in fluid communication with, pump chamber 458. Optionally, device 410 can incorporate a metal-transfer conduit, or riser, 490 connected to an output port. Conduit 490 is preferably used in conjunction with an elbow 508 to transfer the pumped molten metal into another molten metal bath.

Figure 4A:
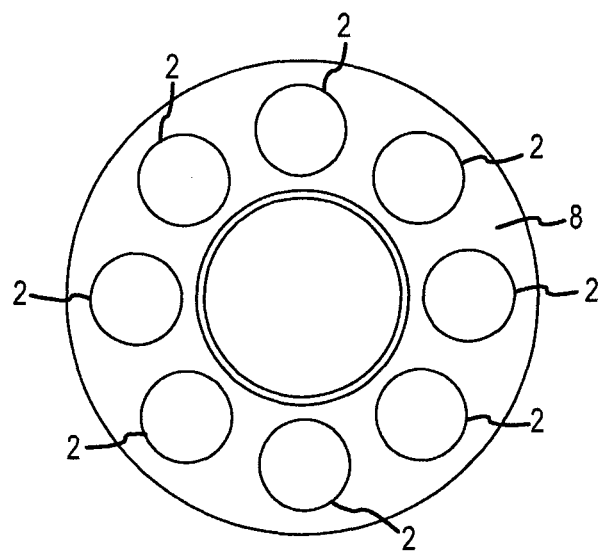
FIG. 4A is a top cut-away view of a molten metal pump support post, which includes a channel for gas delivery with tension rods located between the channel and the outer core in accordance with an embodiment of the invention.
Figure 4B:
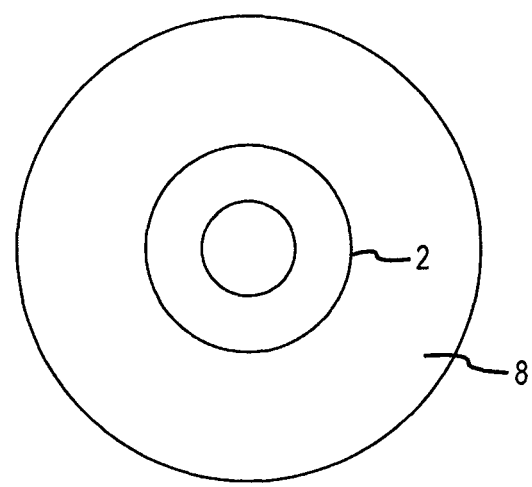
FIG. 4B is a top cut-away view of a molten metal pump support post, which includes a channel for gas delivery within a tension rod inside an outer core in accordance with an embodiment of the invention.

FIG. 4A is a top cut-away view of a support post for molten metal pump, which includes a channel for gas delivery with tension rods between the channel and the outer core in accordance with an embodiment of the invention. Gas can flow through the center channel of the support post while tension rods touching or spaced approximately as shown in FIG. 4A and covered by the outer core 8 can provide the resistance to breakage in the caustic environment. This design can be used with other molten metal pump components, such as an impeller shaft. Alternatively, as shown in FIG. 4B, the gas transfer channel may be located inside of the tension rod which is located within an outer core. In yet another embodiment, the tension rod is positioned between channels in the component and the outer core.

Applying internal forces to an elongated molten metal component includes providing a pre-loaded tension rod inside an outer core for structural refractory materials. The tension rod is preferably constructed of a material such as a metal rod or metal cable. Preferably, the tension rod is formed from material(s) having the same or similar thermal coefficient of expansion as graphite. Among other things, this allows the tension rod to expand and contract at the same rate as other pump components. The outer core is constructed of a structural refractory material such as graphite or ceramic. In one embodiment, this tension rod terminates in an end cap on at least one side of the component. The end cap assists in putting the component under compression. In an alternative embodiment, the tension rod terminates in the molten metal pump superstructure. In yet another embodiment the tension rod terminates within the outer core.

The components utilizing the shaft and post tensioning device are not limited to support posts and impeller shafts but can include any desired device used in molten metal and susceptible to breakage, such as gas delivery shafts or tubes or pump bases. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

Having thus described different embodiments of the invention, other variations and embodiments that do not depart from the spirit of the invention will become apparent to those skilled in the art. The scope of the present invention is thus not limited to any particular embodiment, but is instead set forth in the appended claims and the legal equivalents thereof. Unless expressly stated in the written description or claims, the steps of any method recited in the claims may be performed in any order capable of yielding the desired product.

What is claimed is:

1. A component for use in a molten metal pump, the component comprising:
   an outer core constructed of graphite or ceramic;
   a tension rod positioned at least partially inside the outer core, wherein the tension rod comprises at least one elongate metal cable and at least one, elongated metal rod, and applies an axial compressive force to the outer core in order to make the outer core less susceptible to breakage.

2. The component of claim 1 wherein the tension rod has at least one end, the outer core has a first end and a second end and at least one end of the tension rod extends beyond either the first end or second end of the outer core.

3. The component of claim 2 wherein the component is used in a molten metal pump having a superstructure and the at least one end of the tension rod that extends beyond the first end or second end of the outer core is tightened against the superstructure.

4. The component of claim 2 wherein either the first end or the second end of the outer core has a cap and the end of the tension rod extending beyond the end of the outer core is tightened against the cap.

5. The component of claim 1 wherein at least one end of the tension rod terminates inside of the outer core.

6. The component of claim 1 wherein the tension rod comprises a plurality of metal cables.

7. The component of claim 1 wherein the tension rod is steel.

8. The component of claim 1 wherein the cable is steel.

9. The component of claim 1 that is a molten metal pump support post.

10. The component of claim 1 that is a molten metal pump rotor shaft.

11. The component of claim 1 that is a molten metal degassing shaft.

12. The component of claim 1 wherein the outer core has an interior wall and tension rod is secured in the component by a threaded connection between the tension rod and the interior wall.

13. The component of claim 1 wherein the tension rod is secured in the component by cement placed inside of the outer core.

14. The component of claim 1 wherein the outer core has an internal wall and the tension rod is secured in the component by a threaded connection between the tension rod and the interior wall and by cement placed inside of the outer core.

15. The component of claim 1 wherein the tension rod is bonded to the outer core.

16. The component of claim 1 wherein at least one tension rod is positioned in the center of the outer core.

17. The component of claim 1 wherein there is a gas transfer channel inside of the tension rod.

18. The component of claim 1 wherein the outer core comprises channels and at least one tension rod is positioned inside one of the channels in the outer core.

19. The component of claim 1 wherein the outer core comprises graphite.

20. The component of claim 1 wherein the outer core comprises ceramic.

* * * * *